(12) United States Patent
Reeves et al.

(10) Patent No.: US 11,537,907 B2
(45) Date of Patent: Dec. 27, 2022

(54) ADAPTING A VIRTUAL REALITY EXPERIENCE FOR A USER BASED ON A MOOD IMPROVEMENT SCORE

(71) Applicant: TRIPP, Inc., Venice, CA (US)

(72) Inventors: Nanea Reeves, Marina Del Rey, CA (US); Zachary Norman, Venice, CA (US); Andreja Djokovic, Chicago, IL (US); Stephen Handley, Del Mar, CA (US); Peter Kennedy, Los Angeles, CA (US); Solomon Bothwell, Los Angeles, CA (US); Hyosung Han, Torrance, CA (US)

(73) Assignee: TRIPP, Inc., Los Angeles, CA (US)

( * ) Notice: Subject to any disclaimer, the term of this patent is extended or adjusted under 35 U.S.C. 154(b) by 469 days.

(21) Appl. No.: 16/687,419

(22) Filed: Nov. 18, 2019

(65) Prior Publication Data

US 2020/0160198 A1     May 21, 2020

Related U.S. Application Data

(60) Provisional application No. 62/769,538, filed on Nov. 19, 2018.

(51) Int. Cl.
| | |
|---|---|
| *G06Q 30/00* | (2012.01) |
| *G06N 5/04* | (2006.01) |
| *G06Q 30/02* | (2012.01) |
| *G06N 3/00* | (2006.01) |
| *G06F 16/2457* | (2019.01) |

(52) U.S. Cl.
CPC ......... *G06N 5/04* (2013.01); *G06F 16/24575* (2019.01); *G06N 3/006* (2013.01); *G06Q 30/0217* (2013.01)

(58) Field of Classification Search
None
See application file for complete search history.

(56) References Cited

U.S. PATENT DOCUMENTS

| | | | | |
|---|---|---|---|---|
| 2011/0148916 A1* | 6/2011 | Blattner | ................ | H04L 51/043 345/619 |
| 2013/0211277 A1* | 8/2013 | Berg | ................. | A61M 21/0094 600/27 |

(Continued)

OTHER PUBLICATIONS

PCT International Search Report and Written Opinion, PCT Application No. PCT/US19/62076, dated Feb. 3, 2020, 25 pages.

(Continued)

*Primary Examiner* — Matthew T Sittner
(74) *Attorney, Agent, or Firm* — Fenwick & West LLP

(57) ABSTRACT

A virtual reality application adaptively generates a virtual reality experience intended to improve a user's mood. A plurality of digital assets is stored together with associated scores. A score for a digital asset represents a predicted amount of mood improvement occurring in a cohort of users having similar profiles to a target user in response to virtual reality experiences including the digital asset. A customized virtual reality experience is generated for the target user based at least in part of the user profile data on the scores. The user's change in mood is detected through survey and/or biometric data. Scores for the digital assets may then be updated in order to further learn their respective effects on the cohort of users.

23 Claims, 4 Drawing Sheets

(56) References Cited

U.S. PATENT DOCUMENTS

| | | | |
|---|---|---|---|
| 2016/0035132 A1* | 2/2016 | Shuster | G06F 3/147 |
| | | | 345/633 |
| 2018/0050170 A1* | 2/2018 | Kuhl | G16H 20/70 |
| 2018/0060891 A1* | 3/2018 | Von Cavallar | G06F 16/24575 |
| 2018/0300917 A1* | 10/2018 | Barnett | H04N 5/23293 |
| 2019/0012822 A1* | 1/2019 | Seigneurbieux | G06F 16/9038 |

OTHER PUBLICATIONS

European Patent Office, Extended European Search Report, European Patent Application No. 19886314.4, dated Jul. 14, 2022, 10 pages.

Guo, G. et al. "A New Recommender System for 3D E-Commerce: An EEG Based Approach." Journal of Advanced Management Science, vol. 1, No. 1, Mar. 2013, pp. 61-65.

* cited by examiner

ADAPTING A VIRTUAL REALITY
EXPERIENCE FOR A USER BASED ON A
MOOD IMPROVEMENT SCORE

CROSS-REFERENCE TO RELATED
APPLICATION

This application claims the benefit of U.S. Provisional Application No. 62/769,538 filed on Nov. 19, 2018, which is incorporated by reference herein.

BACKGROUND

Technical Field

This disclosure relates generally to a media content system, and more specifically, to a media device that intelligently provides a virtual reality experience tailored to improve a mood of a particular user.

Description of the Related Art

Conventional media content systems are typically capable of providing static content such as movies or interactive content (such as video games) that may respond to actively controlled inputs provided by a user. For applications such as virtual reality guided meditation, relaxation, or other mood improvement applications, such traditional content has limited effectiveness because it is not sufficiently tailored to a particular user's characteristics or mood state. However, a technical challenge exists in predicting how a user's mood will change based on particular content.

SUMMARY

1. A method, non-transitory computer-readable storage medium, and computer system is disclosed for generating a virtual reality experience. An asset database stores a plurality of digital assets and scores for each of the plurality of digital assets associated with a particular cohort of users. The plurality of digital assets may include, for example, at least one of a graphical asset, an audio asset, and a color palette. User profile data associated with a target user is obtained. The target user is identified as being a member of the particular cohort in response to the target user having similar user data to a group of other users associated with the particular cohort. A subset of the plurality of digital assets are selected for inclusion in a virtual reality experience based at least in part on the scores. A virtual reality experience is generated that includes the selected subset of the plurality of digital assets. Response data is obtained from the target user associated with the virtual reality experience indicative of a change in mood of the target user. The scores are updated for the subset of the plurality of digital assets and the user profile data based on the response data. Updating the user profile data based on the response data may comprise, for example, re-classifying the target user from the particular cohort to a different cohort based on updated user profile data.

In an embodiment, the subset of the plurality of digital assets are selected in part by identifying user-specified digital assets stored in association with the user profile data, and determining the subset of the plurality of digital assets for inclusion in the virtual reality experience based in part on identifying the user-specified digital assets.

In another embodiment, selecting the subset of the plurality of digital assets further comprises selecting the subset based in part on a random selection criterion.

In an embodiment, obtaining the response data from the user comprises obtaining biometric data from the target user during the virtual reality experience and detecting a change in mood based at least in part on the biometric data.

In another embodiment, obtaining the response data from the user comprises obtaining survey data from the target user before and after the virtual reality experience, detecting a change in mood based at least in part on the survey data.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A virtual reality application adaptively generates a virtual reality experience intended to improve a user's mood. A plurality of digital assets is stored together with associated scores. A score for a digital asset represents a predicted amount of mood improvement occurring in a cohort of users having similar profiles to a target user in response to virtual reality experiences including the digital asset. A customized virtual reality experience is generated for the target user based at least in part of the user profile data on the scores. The user's change in mood is detected through survey and/or biometric data. Scores for the digital assets may then be updated in order to further learn their respective effects on the cohort of users.

Figure 1:
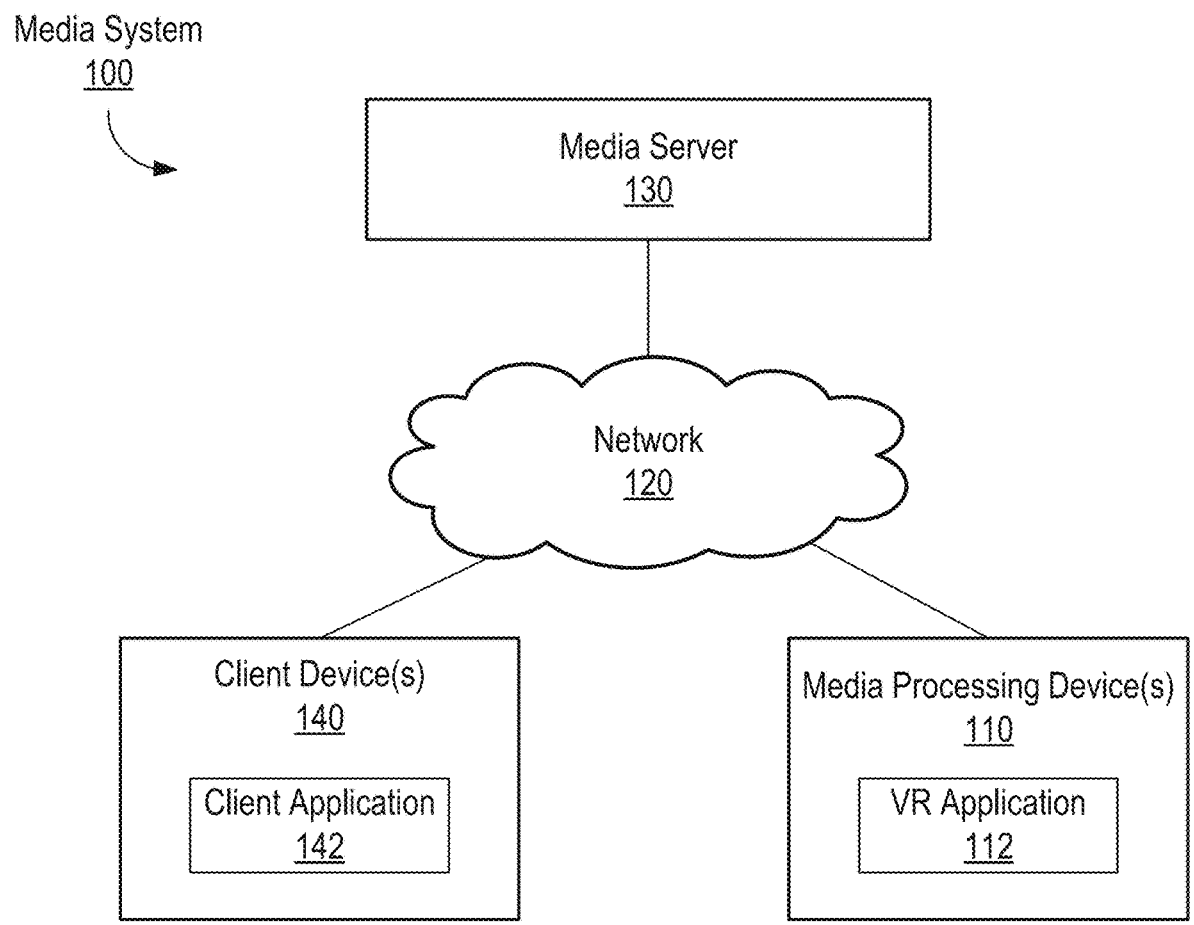
FIG. 1 illustrates an example embodiment of a media system.

FIG. 1 is a block diagram of a media system 100 according to one embodiment. The media system 100 includes a network 120, a media server 130, one or more media processing devices 110 executing a virtual reality (VR) application 112, and one or more client devices 140 executing a client application 142. In alternative configurations, different and/or additional components may be included in the media content system 100.

The media processing device 110 comprises a computer device for processing and presenting media content such as audio, images, video, or a combination thereof. In an embodiment, the media processing device 110 is a head-mounted VR device. The media processing device 110 may detect various inputs including voluntary user inputs (e.g., input via a controller, voice command, body movement, or other convention control mechanism) and various biometric inputs (e.g., breathing patterns, heart rate, etc.). The media processing device 110 may execute a VR application 112 that provides an immersive VR experience to the user, which may include visual and audio media content. The VR application 112 may control presentation of media content in response to the various inputs detected by the media processing device 110. For example, the VR application 112 may adapt presentation of visual content as the user moves his or her head to provide an immersive VR experience. An embodiment of a media processing device 110 is described in further detail below with respect to FIG. 2.

The client devices 140 comprises a computing device that executes a client application 142 providing a user interface to enable the user to input and view information that is directly or indirectly related to a VR experience. For example, the client application 142 may enable a user to set up a user profile that becomes paired with the VR application 112. Furthermore, the client application 142 may present various surveys to the user before and after VR experiences to gain information about the user's reaction to the VR experience. In an embodiment, the client device 140 may comprise, for example, a mobile device, tablet, laptop computer, desktop computer, gaming console, or other network-enabled computer device.

The media server 130 comprises one or more computing devices for delivering media content to the media processing devices 110 via the network 120 and for interacting with the client device 140. For example, the media server 130 may stream media content to the media processing devices 110 to enable the media processing devices 110 to present the media content in real-time or near real-time. Alternatively, the media server 130 may enable the media processing devices 110 to download media content to be stored on the media processing devices 110 and played back locally at a later time. The media server 130 may furthermore obtain user data about users using the media processing devices 110 and process the data to dynamically generate media content tailored to a particular user. Particularly, the media server 130 may generate media content (e.g., in the form of a VR experience) that is predicted to improve a particular user's mood based on profile information associated with the user received from the client application 142 and a machine-learned model that predicts how users' moods improve in response to different VR experiences.

The network 120 may include any combination of local area and/or wide area networks, using both wired and/or wireless communication systems. In one embodiment, the network 120 uses standard communications technologies and/or protocols. In some embodiments, all or some of the communication links of the network 120 may be encrypted using any suitable technique.

Various components of the media system 100 of FIG. 1 such as the media server 130, the media device 110, and the client device 140 can each include one or more processors and a non-transitory computer-readable storage medium storing instructions therein that when executed cause the one or more processors to carry out the functions attributed to the respective devices described herein.

Figure 2:
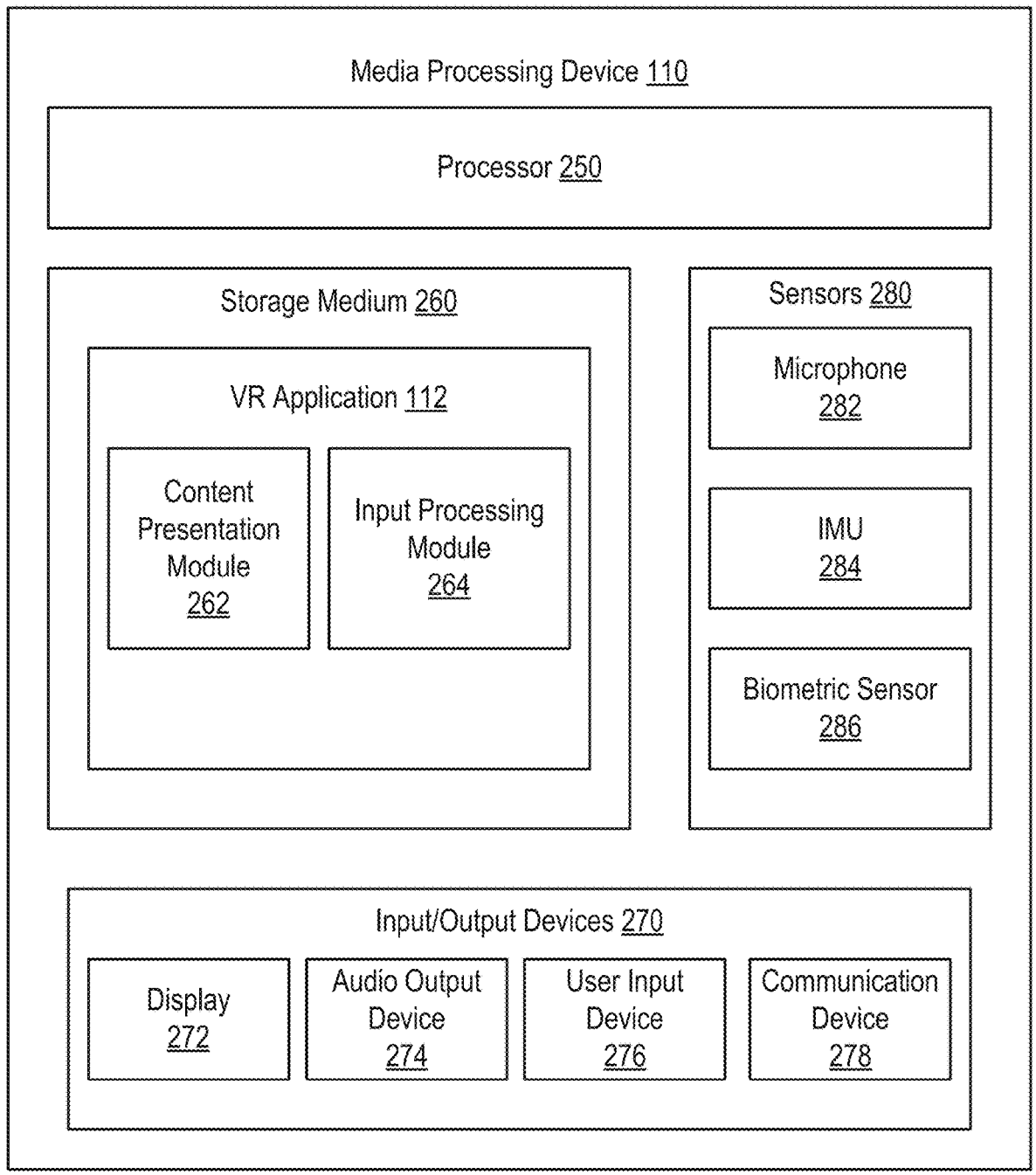
FIG. 2 illustrates an example embodiment of a media processing device.

FIG. 2 is a block diagram illustrating an embodiment of a media processing device 110. In the illustrated embodiment, the media processing device 110 comprises a processor 250, a storage medium 260, input/output devices 270, and sensors 280. Alternative embodiments may include additional or different components.

The input/output devices 270 include various input and output devices for receiving inputs to the media processing device 110 and providing outputs from the media processing device 110. In an embodiment, the input/output devices 270 may include a display 272, an audio output device 274, a user input device 276, and a communication device 278. The display 272 comprises an electronic device for presenting images or video content such as an LED display panel, an LCD display panel, or other type of display. The display 272 may comprise a head-mounted display that presents immersive VR content. The audio output device 274 may include one or more integrated speakers or a port for connecting one or more external speakers to play audio associated with the presented media content. The user input device 276 can comprise any device for receiving user inputs such as a touchscreen interface, a game controller, a keyboard, a mouse, a joystick, a voice command controller, a gesture recognition controller, or other input device. The communication device 278 comprises an interface for receiving and transmitting wired or wireless communications with external devices (e.g., via the network 120 or via a direct connection). For example, the communication device 278 may comprise one or more wired ports such as a USB port, an HDMI port, an Ethernet port, etc. or one or more wireless ports for communicating according to a wireless protocol such as Bluetooth, Wireless USB, Near Field Communication (NFC), etc.

The sensors 280 capture various sensor data that can be provided as additional inputs to the media processing device 110. For example, the sensors 280 may include a microphone 282, an inertial measurement unit (IMU) 284, and one or more biometric sensors 286. The microphone 282 captures ambient audio by converting sound into an electrical signal that can be stored or processed by the media processing device 110. The IMU 284 comprises an electronic device for sensing movement and orientation. For example, the IMU 284 may comprise a gyroscope for sensing orientation or angular velocity and an accelerometer for sensing acceleration. The IMU 284 may furthermore process data obtained by direct sensing to convert the measurements into other useful data, such as computing a velocity or position from acceleration data. In an embodiment, the IMU 284 may be integrated with the media processing device 110. Alternatively, the IMU 284 may be communicatively coupled to the media processing device 110 but physically separate from it so that the IMU 284 could be mounted in a desired position on the user's body (e.g., on the head or wrist).

The biometric sensors 286 comprise one or more sensors for detecting various biometric characteristics of a user such as, for example, heart rate, breathing rate, blood pressure, temperature, or other biometric data. The biometric sensors may be integrated into the media processing device 110, or alternatively, may comprise separate sensor devices that may be worn at an appropriate location on the human body. In this embodiment, the biometric sensors may communicate sensed data to the media processing device 110 via a wired or wireless interface.

The storage medium 260 (e.g., a non-transitory computer-readable storage medium) stores a VR application 112 comprising instructions executable by the processor 250 for carrying out functions attributed to the media processing device 110 described herein. In an embodiment, the VR application 112 includes a content presentation module 262 and an input processing module 264. The content presentation module 262 presents media content via the display 272 and the audio output device 274. The input processing module 264 processes inputs received via the user input device 276 or from the sensors 280 and provides processed input data that may control the output of the content presentation module 262 or may be provided to the media processing server 130. For example, the input processing module 264 may filter or aggregate sensor data from the sensors 280 prior to providing the sensor data to the media server 130.

Figure 3:
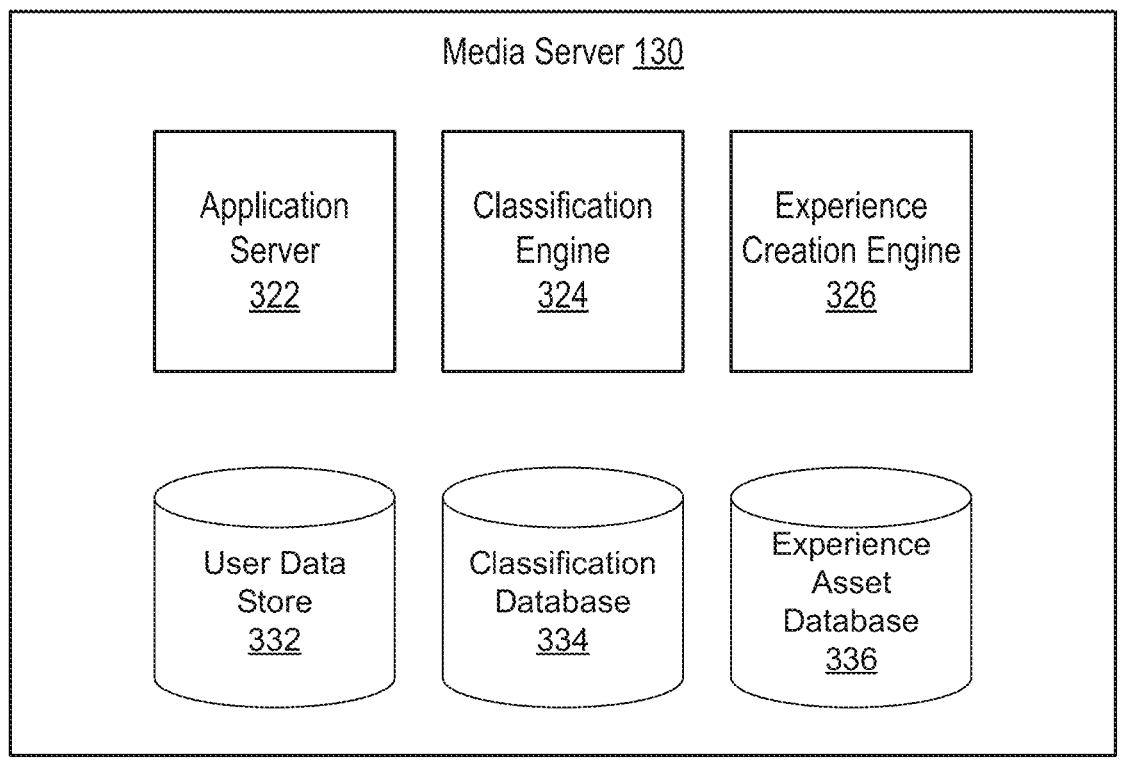
FIG. 3 illustrates an example embodiment of a media server.

FIG. 3 illustrates an example embodiment of a media server 130. The media server 130 comprises an application server 322, a classification engine 324, an experience creation engine 326, a user data store 332, a classification database 334, and an experience asset database 336. In alternative embodiments, the media server 130 may comprise different or additional components. Various components of the media server 130 may be implemented as a processor and a non-transitory computer-readable storage medium storing instructions that when executed by the processor causes the processor to carry out the functions described herein.

The experience asset database 336 stores a plurality of digital assets that may be combined to create a VR experience. Digital assets may include, for example, graphical objects, audio objects, and color palettes. Each digital asset may furthermore be associated with asset metadata describing characteristics of the digital asset and stored in association with the digital asset. For example, a graphic object may have attribute metadata specifying a shape of the object, a size of the object, one or more colors associated with the object, etc.

Graphical objects may comprise, for example, a background scene or template (which may include still images and/or videos), and foreground objects (that may be still images, animated images, or videos). Foreground objects may move in three-dimensional space throughout the scene and may change in size, shape, color, or other attributes over time. Graphical objects may depict real objects or individuals, or may depict abstract creations.

Audio objects may comprise music, sound effects, spoken words, or other audio. Audio objects may include long audio clips (e.g., several minutes to hours) or very short audio segments (e.g., a few seconds or less). Audio objects may furthermore include multiple audio channels that create stereo effects.

Color palettes comprise a coordinated set of colors for coloring one or more graphical objects. A color palette may map a general color attributed to a graphical asset to specific RGB (or other color space) color values. By separating color palettes from color attributes associated with graphical objects, colors can be changed in a coordinated way during a VR experience independently of the depicted objects. For example, a graphical object (or particular pixels thereof) may be associated with the color "green", gut the specific shade of green is controlled by the color palette, such that the object may appear differently as the color palette changes.

Digital assets may furthermore have one or more scores associated with them representative of a predicted association of the digital asset with an improvement in mood that will be experienced by a user having a particular user profile when the digital asset is included in a VR experience. In an embodiment, a digital asset may have a set of scores that are each associated with a different group of users (e.g., a "cohort") that have similar profiles. Furthermore, the experience asset database 336 may track which digital assets were included in different VR experiences and to which users (or their respective cohorts) the digital assets were presented.

In an embodiment, the experience asset database 336 may include user-defined digital assets that are provided by the user or obtained from profile data associated with the user. For example, the user-defined digital assets may include pictures of family members or pets, favorite places, favorite music, etc. The user-defined digital assets may be tagged in the experience asset database 336 as being user-defined and available only to the specific user that the asset is associated with. Other digital assets may be general digital assets that are available to a population of users and are not associated with any specific user.

The experience creation engine 326 generates the VR experience by selecting digital assets from the experience asset database 336 and presenting the digital assets according to a particular time sequence, placement, and presentation attributes. For example, the experience creation engine 326 may choose a background scene or template that may be colored according to a particular color palette. Over time during the VR experience, the experience creation engine 326 may cause one or more graphical objects to appear in the scene in accordance with selected attributes that control when the graphical objects appear, where the graphical objects are placed, the size of the graphical object, the shape of the graphical object, the color of the graphical object, how the graphical object moves throughout the scene, when the graphical object is removed from the scene, etc. Similarly, the experience creation engine 326 may select one or more audio objects to start or stop at various times during the VR experience. For example, a background music or soundscape may be selected and may be overlaid with various sounds effects or spoken word clips. In some embodiments, the timing of audio objects may be selected to correspond with presentation of certain visual objects. For example, metadata associated with a particular graphical object may link the object to a particular sound effect that the experience creation engine 326 plays in coordination with presenting the visual object. The experience creation engine 326 may furthermore control background graphical and/or audio objects to change during the course of a VR experience, or may cause a color palette to shift at different times in a VR experience.

The experience creation engine 326 may intelligently select the which assets to present during a VR experience, the timing of the presentation, and attributes associated with the presentation to tailor the VR experience to a particular user. For example, the experience creation engine 326 may identify a cohort associated with the particular user, and select specific digital assets for inclusion in the VR experience based on their scores for the cohort and/or other factors such as whether the asset is a generic asset or a user-defined asset. In an embodiment, the process for selecting the digital assets may include a randomization component. For example, the experience creation engine 326 may randomly select from digital assets that have at least a threshold score for the particular user's cohort. Alternatively, the experience creation engine 326 may perform a weighted random selection of digital assets where the likelihood of selecting a particular asset is weighted based on the score for the asset associated with the particular user's cohort, weighted based on whether or not the asset is user-defined (e.g., with a higher weight assigned to user-defined assets), weighted based on how recently the digital asset was presented (e.g., with higher weight to assets that have not recently been presented), or other factors. The timing and attributes associated with presentation of objects may be defined by metadata associated with the object, may be determined based on learned scores associated with different presentation attributes, may be randomized, or may be determined based on a combination of factors. By selecting digital assets based on their respective scores, the experience creation engine 326 may generate a VR experience predicted to a have a high likelihood to improve the user's moods.

In an embodiment, the experience creation engine 326 pre-renders the VR experience before being playback such that the digital objects for inclusion and their manner of presentation are pre-selected. Alternatively, the experience creation engine 326 may render the VR experience in substantially real-time by selecting objects during the VR experience for presentation at a future time point within the VR experience. In this embodiment, the experience creation engine 326 may adapt the VR experience in real-time based on biometric data obtained from the user in order to adapt the experience to the user's perceived change in mood. For example, the experience creation engine 326 may compute a mood score based on acquired biometric information during the VR experience and may select digital assets for inclusion in the VR experience based in part on the detected mood score.

The application server 322 obtains various data associated with users of the VR application 112 and the client application 142 during and in between VR experiences and indexes the data to the user data store 332. For example, the application server 322 may obtain profile data from a user during an initial user registration process (e.g., performed via the client application 142) and store the user profile data to the user data store 332 in association with the user. The user profile information may include, for example, a date of birth, gender, age, and location of the user. Once registered, the user may pair the client application 142 with the VR application 112 so that usage associated with the user can be tracked and stored in the user data store 332 together with the user profile information.

In one embodiment, the tracked data includes survey data from the client application 112 obtained from the user between VR experiences, biometric data from the user captured during (or within a short time window before or after) the user participating in a VR experience, and usage data from the VR application 112 representing usage metrics associated with the user. For example, in one embodiment, the application server 322 obtains self-reported survey data from the client application 142 provided by the user before and after a particular VR experience. The self-reported survey data may include a first self-reported mood score (e.g., a numerical score on a predefined scale) reported by the user before the VR experience and a second self-reported mood score reported by the user after the VR experience. The application server 322 may calculate a delta between the second self-reported mood score and the first self-reported mood score, and store the delta to the user data store 332 as a mood improvement score associated with the user and the particular VR experience. Additionally, the application server 322 may obtain self-reported mood tracker data reported by the user via the client application 142 at periodic intervals in between VR experiences. For example, the mood tracker data may be provided in response to a prompt for the user to enter a mood score or in response to a prompt for the user to select one or more moods from a list of predefined defined moods representing how the user is presently feeling. The application server 322 may furthermore obtain other text-based feedback from a user and perform a semantic analysis of the text-based feedback to predict one or more moods associated with the feedback.

The application server 322 may furthermore obtain biometric data from the media processing device 110 that is sensed during a particular VR experience. Additionally, the application server 322 may obtain usage data from the media processing device 110 associated with the user's overall usage (e.g., characteristics of VR experiences experienced by the user, a frequency of usage, time of usage, number of experiences viewed, etc.).

All of the data associated with the user may be stored to the user data store 332 and may be indexed to a particular user and to a particular VR experience.

The classification engine 324 classifies data stored in the user data store 332 to generate aggregate data for a population of users. For example, the classification engine 324 may cluster users into user cohorts comprising groups of users having sufficiently similar user data in the user data store 332. When a user first registers with the media experience server 130, the classification engine 324 may initially classify the user into a particular cohort based on the user's provided profile information (e.g., age, gender, location, etc.). As the user participates in VR experiences, the user's survey data, biometric data, and usage data may furthermore be used to group users into cohorts. Thus, the users in a particular cohort may change over time as the data associated with different users is updated. Likewise, the cohort associated with a particular user may shift over time as the user's data is updated.

The classification engine 324 may furthermore aggregate data associated with a particular cohort to determine general trends in survey data, biometric data, and/or usage data for users within a particular cohort. Furthermore, the classification engine 324 may furthermore aggregate data indicating which digital assets were included in VR experiences experienced by users in a cohort. The classification engine 324 may index the aggregate data to the classification database 334. For example, the classification database 334 may index the aggregate data by gender, age, location, experience sequence, and assets. The aggregate data in the classification database 334 may indicate, for example, how mood scores changed before and after VR experiences including a particular digital asset. Furthermore, the aggregate data in the classification database 334 may indicate, for example, how certain patterns in biometric data correspond to surveyed results indicative of mood improvement.

The classification engine 324 may furthermore learn correlations between particular digital assets included in experiences viewed by users within a cohort and data indicative of mood improvement. The classification engine 324 may update the scores associated with the digital assets for a particular cohort based on the learned correlations.

Figure 4:
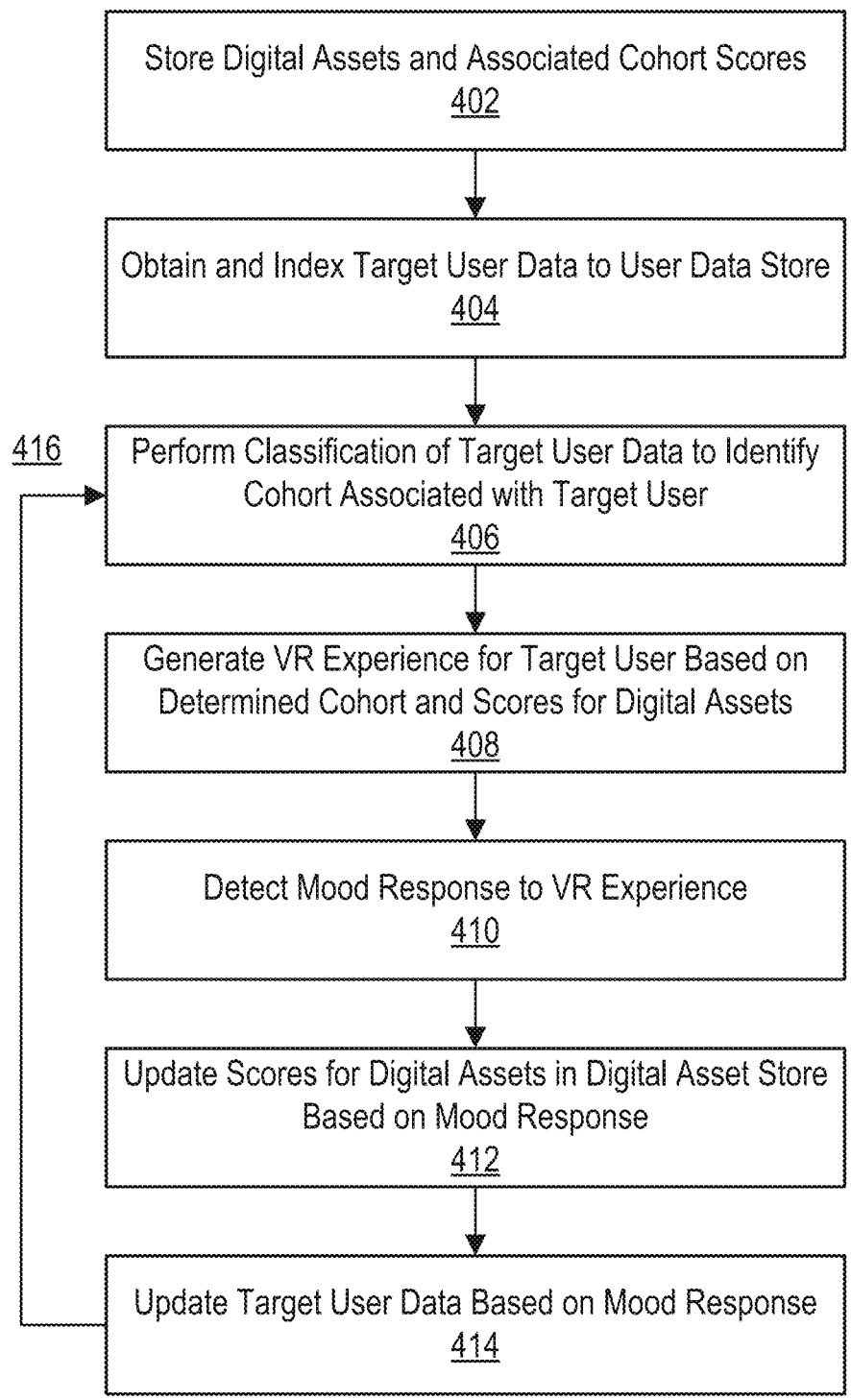
FIG. 4 illustrates an example embodiment of a process for generating a VR experience based on mood improvement scores.

FIG. 4 illustrates an example embodiment of a process for generating a virtual reality experience tailored to improve a mood of a target user. The media server 130 stores 402 a set of digital assets from which VR experiences can be generated and a set of cohort scores associated with each digital asset. The cohort scores for a given digital asset are each associated with a different cohort of users having similar user profiles. The media server 130 furthermore obtains and indexes 404 target user profile data for a target user to a user data store 332. The profile data may include demographic information associated with the target user, usage data associated with the user, survey data received from the user, or other profile information. The media server 130 performs 406 a classification of the target user data to identify a cohort associated with the target user representing a group of users having similar user profiles. The media server 130 then generates 408 a VR experience for the target user based on the determined cohort and the scores for the stored digital assets. Particularly, the VR experience may be generated by selecting digital assets to include in the VR experience based at least in part on the scores, and rendering a presentation that may include a plurality of digital assets presented in accordance with various presentation attributes. In some embodiments, the selection of digital assets may furthermore be based in part on a randomized component, whether the digital asset is a user-defined or generic asset, how recently the digital asset was presented, or other factors. The media server 130 detects 410 a mood response metric for the target user. The mood response metric may be determined based on, for example, survey data, biometric data, or a combination thereof indicative of whether the VR experience improved the target user's mood, and by how much. For example, the mood response metric may comprise a delta between a post-VR experience numerical mood response rating and a pre-VR experience numerical mood response determined from surveys. Alternatively, the mood response metric may be determined based on a change in biometric data between the beginning and the end of the VR experience. The media server 130 updates 412 the scores for the digital assets included in the VR experience based on the determined mood response. For example, the scores may increase in response to a positive mood response and may decrease in response to a negative mood response. The media server 130 furthermore updates 414 the target user data based on the mood response. The process may then repeat 416 for future VR experiences.

When updating the scores for the digital assets, the updated scores may be stored in the digital asset store so that these scores may be accessed by other media processing devices 110 and may affect VR experiences generated for other users in the same cohort. For example, the updated scores may be computed as a weighted average of all the VR experiences across all users in the cohort where the digital asset is presented. Thus, digital assets tending to result in great mood improvement will be selected more frequently.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method for adaptively generating a virtual reality experience, the method comprising:
storing, by a media server to an asset database, a plurality of digital assets and scores for each of the plurality of digital assets associated with a particular cohort of users, wherein the scores represent a predicted change in numerical mood responses occurring in the particular cohort of users in virtual reality experiences;
obtaining, by the media server, user profile data associated with a target user of a media processing device;
identifying, by the media server, that the target user is a member of the particular cohort in response to the target user having similar user data to a group of other users associated with the particular cohort;
selecting, by the media server, a subset of the plurality of digital assets for inclusion in a virtual reality experience displayed at the media processing device based at least in part on the scores;
generating, by the media server, a virtual reality experience that includes the selected subset of the plurality of digital assets for display at the media processing device;
obtaining, by the media server, response data from the target user via the media processing device associated with the virtual reality experience, the response data indicative of a change in mood of the target user; and
updating, by the media server, the scores for the subset of the plurality of digital assets and the user profile data based on the response data.

2. The method of claim 1, wherein selecting the subset of the plurality of digital assets further comprises:
identifying user-specified digital assets stored in association with the user profile data; and
determining the subset of the plurality of digital assets for inclusion in the virtual reality experience based in part on identifying the user-specified digital assets.

3. The method of claim 1, wherein selecting the subset of the plurality of digital assets further comprises:
weighting likelihoods of selecting the plurality of digital assets; and
performing a weighted random selection of the plurality of digital assets to obtain the subset of the plurality of digital assets.

4. The method of claim 1, wherein obtaining the response data from the user comprises:
obtaining biometric data from the target user during the virtual reality experience; and
detecting a change in mood based at least in part on the biometric data.

5. The method of claim 1, wherein obtaining the response data from the user comprises:
obtaining survey data from the target user before and after the virtual reality experience; and
detecting a change in mood based at least in part on the survey data.

6. The method of claim 1, wherein updating the user profile data based on the response data comprises:
re-classifying the target user from the particular cohort to a different cohort based on updated user profile data.

7. The method of claim 1, wherein the plurality of digital assets includes at least one of a graphical asset, an audio asset, and a color palette.

8. The method of claim 3, wherein the weighting is based on one or more of the scores for each of the plurality of digital assets associated with the particular cohort of users, sources that defined each of the plurality of digital assets, or times since each of the plurality of digital assets was presented.

9. The method of claim 1, wherein the obtained response data comprises a first set of response data obtained prior to a presentation of the selected subset of the plurality of digital assets to the target user and a second set of response data obtained after the presentation of the selected subset of the plurality of digital assets to the target user, further comprising:
determining, using the second set of response data, a pre-experience numerical mood response of the target user;
determining, using the second set of response data, a post-experience numerical mood response of the target user; and
determining a mood response metric comprising a delta between the post-experience numerical mood response and the pre-experience numerical mood response, wherein the mood response metric is indicative of the change in mood of the target user.

10. The method of claim 1, wherein the selected subset of the plurality of digital assets within the virtual reality experience are displayed using a first color palette, further comprising:
determining a second color palette using the obtained response data; and
displaying each of the selected subset of the plurality of digital assets within the virtual reality experience using the second color palette.

11. A non-transitory computer-readable storage medium storing instructions for adaptively generating a virtual reality experience, the instructions when executed by a processor causing the processor to perform steps including:
storing, to an asset database, a plurality of digital assets and scores for each of the plurality of digital assets associated with a particular cohort of users, wherein the scores represent a predicted change in numerical mood responses occurring in the particular cohort of users in virtual reality experiences;
obtaining user profile data associated with a target user of a media processing device;
identifying that the target user is a member of the particular cohort in response to the target user having similar user data to a group of other users associated with the particular cohort;
selecting a subset of the plurality of digital assets for inclusion in a virtual reality experience displayed at the media processing device based at least in part on the scores;
generating a virtual reality experience that includes the selected subset of the plurality of digital assets for display at the media processing device;
obtaining response data from the target user via the media processing device associated with the virtual reality experience, the response data indicative of a change in mood of the target user; and
updating the scores for the subset of the plurality of digital assets and the user profile data based on the response data.

12. The non-transitory computer-readable storage medium of claim 11, wherein selecting the subset of the plurality of digital assets further comprises:
identifying user-specified digital assets stored in association with the user profile data; and
determining the subset of the plurality of digital assets for inclusion in the virtual reality experience based in part on identifying the user-specified digital assets.

13. The non-transitory computer-readable storage medium of claim 11, wherein selecting the subset of the plurality of digital assets further comprises:
weighting likelihoods of selecting the plurality of digital assets; and
performing a weighted random selection of the plurality of digital assets to obtain the subset of the plurality of digital assets.

14. The non-transitory computer-readable storage medium of claim 11, wherein obtaining the response data from the user comprises:
obtaining biometric data from the target user during the virtual reality experience; and
detecting a change in mood based at least in part on the biometric data.

15. The non-transitory computer-readable storage medium of claim 11, wherein obtaining the response data from the user comprises:
obtaining survey data from the target user before and after the virtual reality experience; and
detecting a change in mood based at least in part on the survey data.

16. The non-transitory computer-readable storage medium of claim 11, wherein updating the user profile data based on the response data comprises:
re-classifying the target user from the particular cohort to a different cohort based on updated user profile data.

17. The non-transitory computer-readable storage medium of claim 11, wherein the plurality of digital assets includes at least one of a graphical asset, an audio asset, and a color palette.

18. A computer system comprising:
a processor; and
a non-transitory computer-readable storage medium storing instructions for adaptively generating a virtual reality experience, the instructions when executed by the processor causing the processor to perform steps including:
storing, to an asset database, a plurality of digital assets and scores for each of the plurality of digital assets associated with a particular cohort of users, wherein the scores represent a predicted change in numerical mood responses occurring in the particular cohort of users in virtual reality experiences;
obtaining user profile data associated with a target user of a media processing device;
identifying that the target user is a member of the particular cohort in response to the target user having similar user data to a group of other users associated with the particular cohort;

selecting a subset of the plurality of digital assets for inclusion in a virtual reality experience displayed at the media processing device based at least in part on the scores;

generating a virtual reality experience that includes the selected subset of the plurality of digital assets for display at the media processing device;

obtaining response data from the target user via the media processing device associated with the virtual reality experience, the response data indicative of a change in mood of the target user; and updating the scores for the subset of the plurality of digital assets and the user profile data based on the response data.

19. The computer system of claim 18, wherein selecting the subset of the plurality of digital assets further comprises:

identifying user-specified digital assets stored in association with the user profile data; and determining the subset of the plurality of digital assets for inclusion in the virtual reality experience based in part on identifying the user-specified digital assets.

20. The computer system of claim 18, wherein selecting the subset of the plurality of digital assets further comprises:

weighting likelihoods of selecting the plurality of digital assets; and performing a weighted random selection of the plurality of digital assets to obtain the subset of the plurality of digital assets.

21. The computer system of claim 18, wherein obtaining the response data from the user comprises:

obtaining biometric data from the target user during the virtual reality experience; and detecting a change in mood based at least in part on the biometric data.

22. The computer system of claim 18, wherein obtaining the response data from the user comprises:

obtaining survey data from the target user before and after the virtual reality experience; and detecting a change in mood based at least in part on the survey data.

23. The computer system of claim 18, wherein updating the user profile data based on the response data comprises:

re-classifying the target user from the particular cohort to a different cohort based on updated user profile data.

* * * * *